United States Patent
Sorkin et al.

(10) Patent No.: US 11,732,663 B2
(45) Date of Patent: Aug. 22, 2023

(54) STARTER-GENERATOR SPEED CONTROL

(71) Applicant: SAFRAN POWER USA, LLC, Twinsburg, OH (US)

(72) Inventors: Lev Sorkin, Twinsburg, OH (US); Cory Ackerman, Twinsburg, OH (US); Nathen Hutchison, Twinsburg, OH (US); Benjamin Lange, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 0 days.

(21) Appl. No.: 17/922,881

(22) PCT Filed: May 6, 2020

(86) PCT No.: PCT/US2020/031665
§ 371 (c)(1),
(2) Date: Nov. 2, 2022

(87) PCT Pub. No.: WO2021/225589
PCT Pub. Date: Nov. 11, 2021

(65) Prior Publication Data
US 2023/0167779 A1    Jun. 1, 2023

(51) Int. Cl.
*F02D 41/06* (2006.01)
*F02N 11/08* (2006.01)

(52) U.S. Cl.
CPC ........ *F02D 41/062* (2013.01); *F02N 11/0859* (2013.01); *F02D 2200/101* (2013.01); *F02N 2200/022* (2013.01)

(58) Field of Classification Search
CPC ............ F02D 41/062; F02D 2200/101; F02N 11/0859; F02N 2200/022
See application file for complete search history.

(56) References Cited

U.S. PATENT DOCUMENTS

| | | | |
|---|---|---|---|
| 6,505,594 B1* | 1/2003 | Katayama | F02P 5/06 123/179.18 |
| 7,448,220 B2* | 11/2008 | Schmidt | F02C 7/32 60/788 |
| 2015/0316016 A1* | 11/2015 | Nakashima | F02N 11/0818 701/103 |

(Continued)

FOREIGN PATENT DOCUMENTS

JP    2009-127438 A    6/2009

OTHER PUBLICATIONS

International Search Report and Written Opinion, International Application No. PCT/US2020/031665 dated Jan. 28, 2021, 13 pages.

*Primary Examiner* — Sizo B Vilakazi
(74) *Attorney, Agent, or Firm* — Rankin, Hill & Clark LLP

(57) ABSTRACT

Systems and techniques for engine starter control may include determining a current speed band associated with an engine start for a current time increment, determining a previous speed band associated with the engine start for a previous time increment within the engine start, receiving a measured current value, determining a target current value based on the current speed band, the previous speed band, whether an acceleration or deceleration occurred between the current speed band and the previous speed band, and a mode of a system for engine starter control, and adjusting a current for the engine start based on the target current value.

20 Claims, 7 Drawing Sheets

(56) References Cited

U.S. PATENT DOCUMENTS

2016/0138549 A1\* 5/2016 Kuniyoshi ............... H02P 1/04
                                                                              290/38 R
2020/0318553 A1\* 10/2020 Dixon .................. F02D 41/064

\* cited by examiner

STARTER-GENERATOR SPEED CONTROL

BACKGROUND

Currently, mostly used methods that facilitate a speed control mode for starter-generator (SG) speed control include field oriented control (FOC) and space vector modulation (SVM) control algorithms. Both algorithms provide an accurate and stable speed controls but both employ software code and digital signal processors (DSP). This may create a certification challenge for implementation in airborne systems. For field-programmable gate array (FPGA) based start controllers, a simplified speed control algorithm would introduce new functionality without a massive re-certification burden.

BRIEF DESCRIPTION

According to one aspect, a system for engine starter control may include a controller determining a current speed band associated with an engine start for a current time increment, determining a previous speed band associated with the engine start for a previous time increment within the engine start, receiving a measured current value, determining a target current value based on the current speed band, the previous speed band, and whether an acceleration or deceleration occurred between the current speed band and the previous speed band, and adjusting a current for the engine start based on the target current value.

The controller may determine the target current value based on a mode of the system for engine starter control. The mode of the system for engine starter control may be a speed mode or torque mode. The controller may determine the target current value based on two or more different lookup tables. The controller may select a first lookup table of the two or more different lookup tables based on a mode of the system for engine starter control. The controller may select a row of the first lookup table based on the current speed band associated with the engine start. The controller may select a column of the first lookup table based on the acceleration or deceleration determination. The controller may operate in a coast state as an initial state for the engine start. The controller may determine the target current value based on an outer low speed threshold. The controller may determine the target current value based on a threshold target and a lower than nominal threshold.

According to one aspect, a system for engine starter control may include a controller determining a current speed band associated with an engine start for a current time increment, determining a previous speed band associated with the engine start for a previous time increment within the engine start, receiving a measured current value, determining a target current value based on the current speed band, the previous speed band, whether an acceleration or deceleration occurred between the current speed band and the previous speed band, and a mode of the system for engine starter control, and adjusting a current for the engine start based on the target current value.

The mode of the system for engine starter control may be a speed mode or torque mode. The controller may determine the target current value based on two or more different lookup tables. The controller may determine the target current value based on an outer low speed threshold.

A method for engine starter control may include determining a current speed band associated with an engine start for a current time increment, determining a previous speed band associated with the engine start for a previous time increment within the engine start, receiving a measured current value, determining a target current value based on the current speed band, the previous speed band, whether an acceleration or deceleration occurred between the current speed band and the previous speed band, and a mode of a system for engine starter control, and adjusting a current for the engine start based on the target current value.

The mode of the system for engine starter control is a speed mode or torque mode. A method for engine starter control may include determining the target current value based on two or more different lookup tables, selecting a first lookup table of the two or more different lookup tables based on the mode of the system for engine starter control, selecting a row of the first lookup table based on the current speed band associated with the engine start, and/or selecting a column of the first lookup table based on the acceleration or deceleration determination.

DETAILED DESCRIPTION

Generally, a jet engine start may be achieved by delivering a starting torque from a starter (e.g., electrical or air) to an engine. Such torque causes the engine to accelerate, and when a predetermined speed may be reached, the engine controller sends a command to initiate the engine ignition and to supply engine with fuel.

As engine rotation speed continues to increase via acceleration, the starter continuously supplies the torque. When the engine "start cutoff speed" is reached, the start command may be removed and the starter stops delivering the torque.

According to one aspect, engine start efficiency or engine reliability may benefit by splitting the start process into two modes; a torque mode and a speed mode. For example, the start process may begin in a torque mode and then transition into a speed mode. In the speed mode, a constant rotational speed may be maintained. When engine optimal starting conditions are met, a command to transition to the torque mode may be issued and the starter switches to supplying an engine acceleration torque in the torque mode until the start cutoff speed is reached.

Generally with battery current feedback control, current that is consumed from the starting power supply may be regulated to a target value and maximum torque that can be produced at that target current value is produced. The current is regulated by comparing the target current value to a measured current value and either adjusting the inverter pulse width up to increase the current or adjusting the inverter pulse width down to decrease the current as desired. The target current may be taken from one of two or more configuration lookup tables providing the selection between two or more starting profiles (e.g., high torque or low torque) based on a mode of operation.

Figure 1:
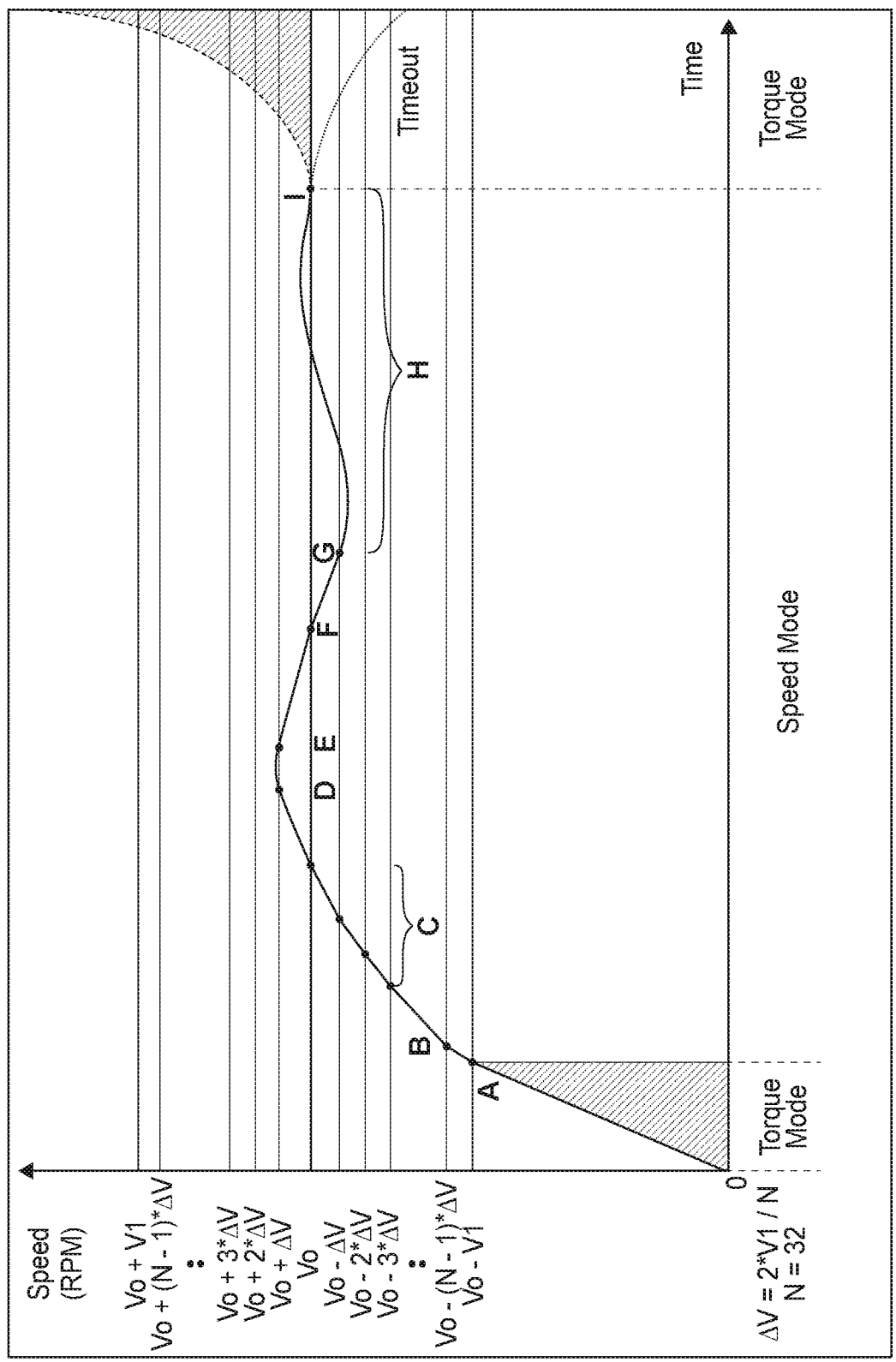
FIG. 1 is an exemplary illustration of a speed profile associated with an engine starter control system, according to one aspect.

As seen in an exemplary speed profile of FIG. 1, the engine starter control system may operate in two modes; a torque mode and speed mode. The engine starter control system may make adjustments to the target current value. This adjusted target current value may be provided as an input to the existing battery current feedback control algorithm in place of a lookup table target current value. For example, in speed mode, the engine starter control system may obtain the target current input value from a different source than in torque mode. During torque mode, the target value may be obtained from the configuration table or the lookup table. During speed mode, the target current input value may be obtained via a function of a speed control algorithm, as will be discussed in greater detail herein.

According to one aspect, the starter-generator operation in speed control mode with transitions between the torque mode into speed mode and back to torque mode. The engine starter control system may employ speed and acceleration and/or deceleration information to define the target starter current utilized to maintain constant speed operation.

FIG. 1 is an exemplary illustration of a speed profile associated with an engine starter control system, according to one aspect. According to one aspect, the start sequence for the engine starter control system may begin in the torque mode. When the first speed control band (Vo–V1) threshold may be crossed (e.g., point A on FIG. 1).

The start sequence may include the following segments and speed control bands:

0-A: torque mode
A: outer low speed threshold crossed
  PWM=PWM–Mo, where Mo may be a configurable constant (e.g., ranging from 0-63). Acceleration ($\alpha=\Delta velocity/\Delta time$) may be calculated.
B: when the speed crosses the next threshold, calculate the acceleration and adjust the PWM.
  PWM=PWM–m(V, $\alpha$), where v may be the starter rpm, $\alpha$ may be the acceleration and m may be a constant from the m($\alpha$, V) lookup table.
C: continue calculating acceleration with each crossing and adjust PWM per m(V, $\alpha$) to achieve zero acceleration at the targeted speed.
D/E: speed crosses the same threshold which indicates zero acceleration. No change to PWM.
F: threshold target crossed, indicating deceleration. Depending upon rate, either no change or increase PWM.
G: a lower than nominal threshold may be crossed. Increase PWM per m(V, $\alpha$).
H: continue calculating acceleration and adjusting PWM according to B-G above until either torque mode or timeout.
I: torque mode or timeout signal detected.

Torque Mode

In torque mode, current may be regulated by comparing a target current value to a measured current value, where the target current value may be obtained from the current lookup table, such as a lookup table stored in a storage drive or configuration register of the engine controller. Alternatively, the storage drive could be a memory element. According to one aspect, there may be a first lookup table utilized for a high torque mode and a second lookup table for a low torque mode. A config_register_low_torque_batt_I_target signal and/or a config_register_high_torque_batt_I_target signal may be utilized to select the first lookup table or the second lookup table. In other words, values received from the configuration register may be utilized to implement the high torque or low torque configuration tables accordingly.

Speed Mode

In speed mode, current may be regulated by comparing a target current value to a measured current value, where the target current value may be determined based on engine acceleration and the instant speed information or based on the speed control algorithm described herein.

According to one aspect, depending on the external conditions (e.g., temperature, among others), the value of a dwelling speed of the engine may vary. Therefore, multiple preset constant speed mode values may be implemented.

The controller may determine the target current value based on a mode of the system for engine starter control (i.e., speed mode/speed start mode or torque mode). In other words, the mode of the system for engine starter control is a speed mode or torque mode.

Implementing the mixed (e.g., torque/speed/torque) starting algorithm with a preset speed mode speed selection in hardware may provide a simplified system solution for original equipment manufacturers (OEM). Realizing such a system in hardware and/or firmware, without any requirement for developing software in addition to firmware for such control may provide a faster development and certification route. In this way, a simple, robust, hardware-based control implemented without the use of microcontrollers may be provided for jet engine brushless starter-generators, for example.

A coast state may be inserted into the start sequence state machine as an initial state upon entering start mode. The controller may operate in this coast state as an initial state for the engine start. During the coast state, the SGCU (Starter Generator Control Unit) does nothing. In other words, the SGCU may wait until appropriate conditions are met to operate. Also, throughout the entire start sequence, a condition may be added as a start exit condition. This exit condition may be based on a timer that counts an amount of time operated in speed control. If the timer expires before the transition to torque control occurs, then the start may be aborted.

Switching the target current value for battery current feedback control and the changes to the start sequence state machine may be implemented within the SGCU logic. Additionally, freestanding logic that is used to decide when to switch the target current value over to speed control and the value of the target current during speed control may be implemented within the SGCU.

Figure 2:
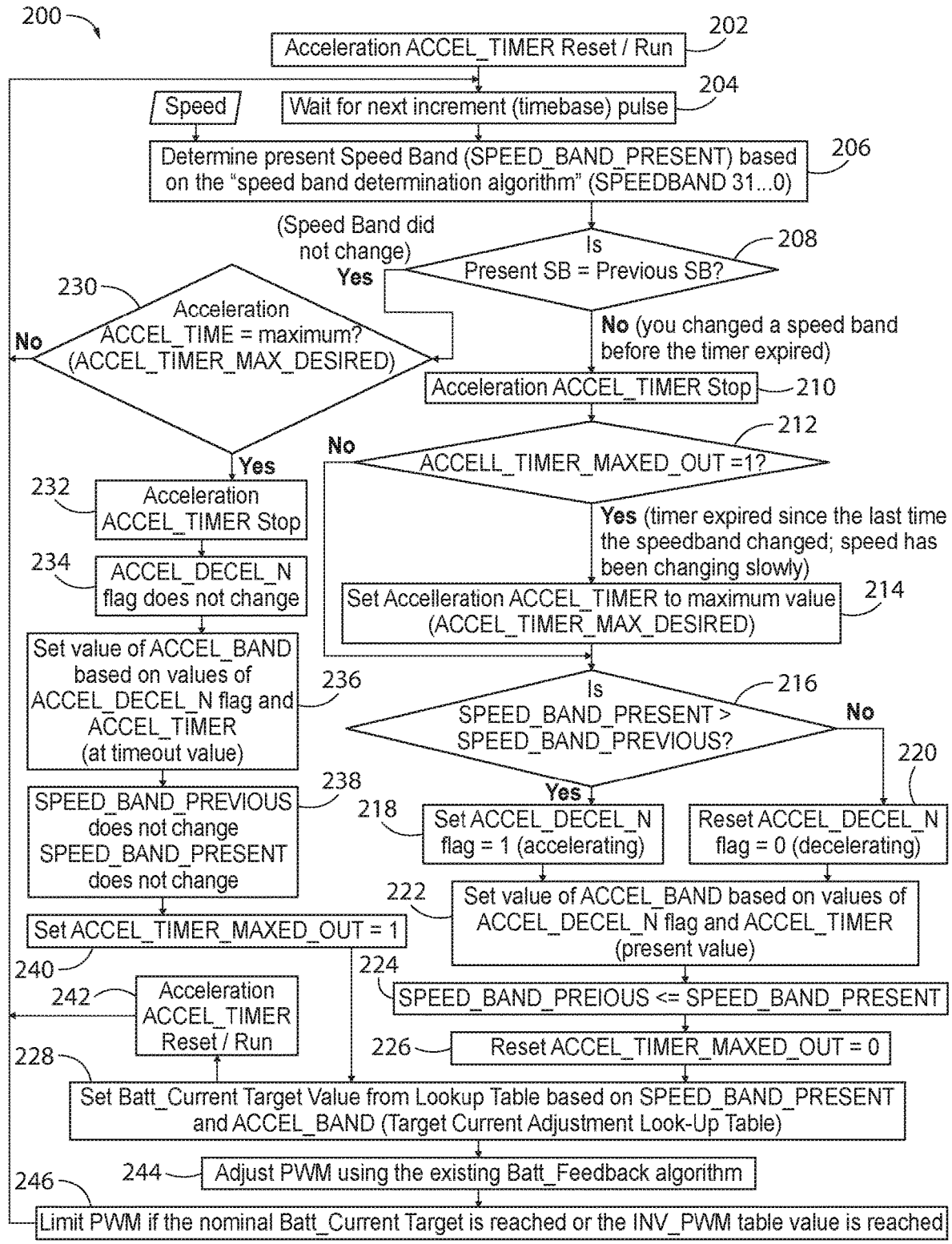
FIG. 2 is an exemplary flow diagram of a method for engine starter control, according to one aspect.

FIG. 2 is an exemplary flow diagram of a method 200 for engine starter control, according to one aspect. The method 200 for engine starter control of FIG. 2 may include resetting or running 202 an acceleration_timer signal, watching 204 for an increment or time pulse, determining 206 an associated current or present speed band (e.g., the controller may determine a current speed band associated with an engine start for a current time increment), determining 208 whether a change in the speed band occurred (e.g., the controller may determine the current speed band and the previous speed band associated with the engine start for the current time increment and the previous time increment, respectively), if a change in the speed band did occur, stopping 210 the acceleration timer, determining 212 if the timer timed out, if the timer did time out, setting 214 the acceleration_timer signal to a maximum value, determining 216 if the current speed band is greater than the previous speed band and setting 218, 220 an acceleration_deceleration flag accordingly, setting the speed_band_previous value 222 with the speed_band_present value, resetting 224 the acceleration_timer_maxed_out signal, setting 226 a value of the acceleration band based on values of the flags, setting 228 a battery_current target value from a lookup table based on speed_band_present and acceleration_band adjusting 244 the PWM accordingly, and limiting 246 the PWM if a nominal battery_current target is reached or if an inverse PWM table value is reached. The acceleration_band signal may be indicative of what column from a target current adjustment lookup table to use while speed_band may be indicative of which row from the target current adjustment lookup table to use.

If the speed band did not change 208, determining 230 whether the acceleration_timer signal is at a maximum, if the acceleration_timer signal is at a maximum, stopping 232 the acceleration_timer signal, setting 236 a value of the acceleration_band based on the acceleration_deceleration flag 218 and 220, setting 240 the acceleration_timer_ maxed_out signal equal to one, setting 228 a battery_current target value from a lookup table based on speed_band_present and acceleration_band, adjusting 244 the PWM accordingly, and limiting 246 the PWM if a nominal battery_current target is reached or if an inverse PWM table value is reached. The acceleration_band signal may be indicative of what column from a target current adjustment lookup table to use while speed_band may be indicative of which row from the target current adjustment lookup table to use.

In this way, the controller may determine a target current value based on the current speed band, the previous speed band, and whether an acceleration or deceleration occurred between the current speed band and the previous speed band and adjust a current for the engine start based on the target current value. The controller may determine the target current value based on two or more different lookup tables or depending on the mode of the system. For example, the controller may select a first lookup table of the two or more different lookup tables based on a mode of the system for engine starter control. The controller may select a second lookup table of the two or more different lookup tables based on a mode of the system for engine starter control being a different mode.

Further, the controller may select a row of the first lookup table based on the current speed band associated with the engine start. The controller may select a column of the first lookup table based on the acceleration or deceleration determination or whether acceleration or deceleration is occurring within a predetermined range for the speed mode. For example, the controller may determine the target current value based on an outer low speed threshold, which may be indicative of a threshold which is associated with torque mode operation when the measured current is below. As another example, the controller may determine the target current value based on a threshold target (i.e., a target current) and a lower than nominal threshold which may be crossed while maintaining speed mode.

Figure 3:
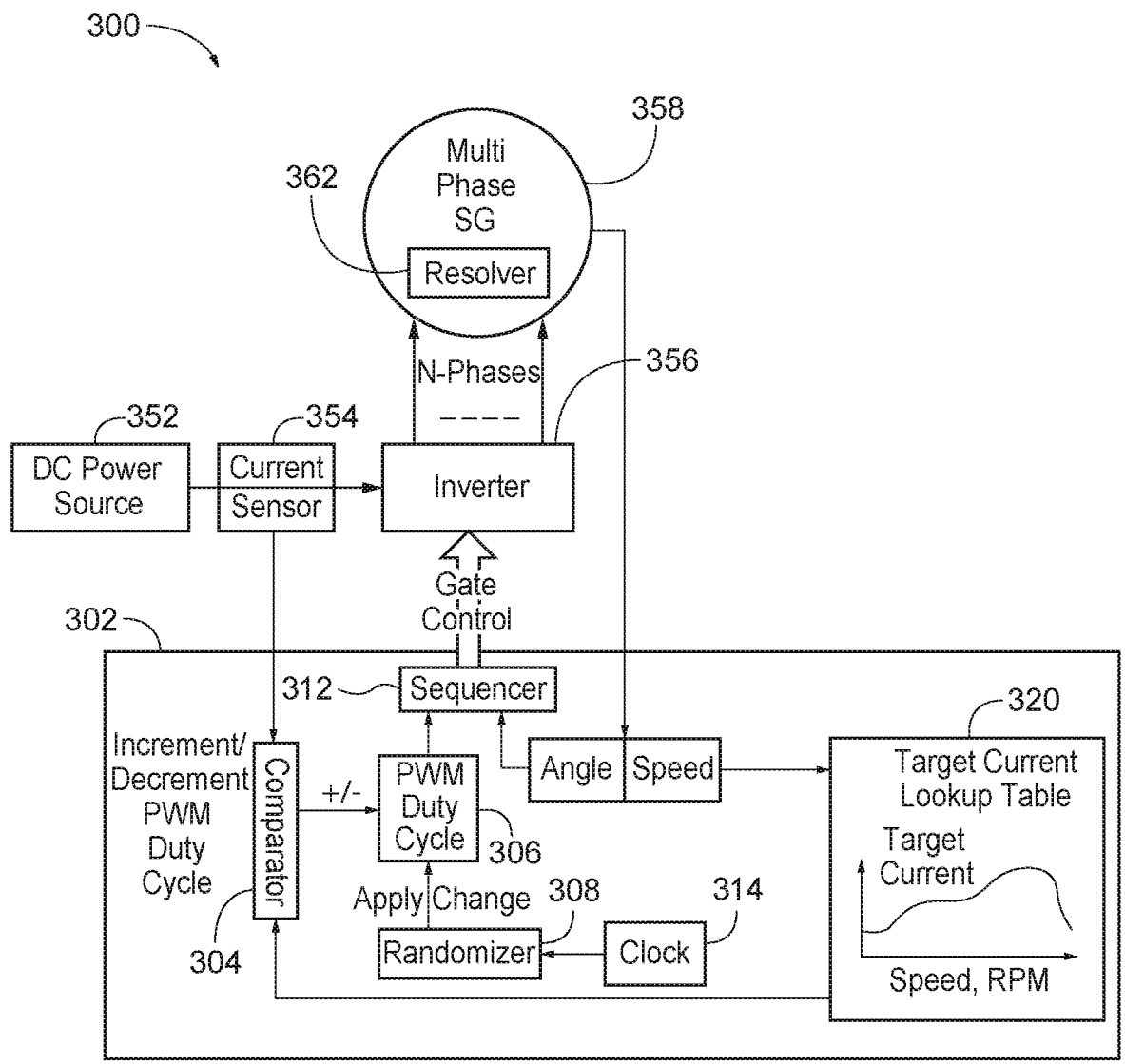
FIG. 3 is an exemplary component diagram of a system for engine starter control, according to one aspect.

FIG. 3 is an exemplary component diagram of a system for engine starter control, according to one aspect. Brushless-type starter-generators (SG) may be controlled using brushless motor control algorithms. Brushless motor control algorithms may be optimized to efficiently drive brushless generators when the brushless SG are operating in a starter operating mode.

FIG. 3 is an exemplary component diagram of a system for engine starter control, according to one aspect. The system for engine starter control may control the brushless SG during an engine start mode. The system for engine starter control may include a controller 302. The controller 302 may include a comparator 304, a pulse width modulation (PWM) duty cycle generator 306, a randomizer 308, a sequencer 312, and a clock 314.

In FIG. 3, it can be seen that a direct current (DC) power source 352 provides DC power to an inverter 356 which drives a multi-phase starter-generator (SG) 358 which may be associated with N number of phases. The system for engine starter control may include the controller 302 or a SGCU which controls the inverter 356. For example, the system for engine starter control may control the brushless SG 358 during the engine start mode by controlling the current from the DC power source 352 provided to the inverter 356.

A current sensor 354 may measure a current (e.g., the controller may receive a measured current value) associated with the DC power source 352 and provide this measurement as an input for the controller 302. Additionally, the multi-phase SG 358 may provide positional angle and rotational speed (e.g., time derivative of the positional angle) as an input to the controller 302 via a resolver 362 of the multi-phase SG. The rotational speed may be a time derivative of a positional angle associated with the SG. The SG 358 may include the resolver 362 determining the positional angle and/or rotational speed.

Using the positional angle provided by the resolver 362 of the multi-phase SG, the controller 302 may determine a target current via a lookup table, which may be stored in a storage drive (also known as a memory element) 320 of the controller 302. The lookup table may be indicative of a target current given a rotational speed of the multi-phase SG. In this way, the controller 302 may determine the target current value based on the input of positional angle and/or rotational speed and the lookup table. Stated another way, the rotational speed may be used to address the target current lookup table stored in a memory or storage drive 320 of the controller 302 and calculations associated therewith executed by a processor of the controller 302. According to one aspect, the target current value changes with a change in rotational speed within the lookup table. In this way, the controller 302 may regulate the source current by controlling the inverter PWM in a manner such that the power source instant current value is equal to the target current value from the lookup table. The target current from the target current lookup table may be determined by the SGCU based on the rotational speed associated with the SG 358 driven by the inverter 356.

A comparator 304 within the controller 302 may compare the target current value with the current associated with the DC power source 352 provided by the DC source current sensor output. The comparator 304 may determine whether to increase or decrease a current value of a PWM duty cycle. The comparator 304 may determine whether to increase or decrease the current value of the PWM duty cycle based on the need to increase or decrease the inverter input current. For example, each time a current correction is determined, the PWM duty cycle may be incremented or decremented by the same amount. The comparator 304 may receive a current reading from the current sensor 354 and a target current from a target current lookup table (e.g., which may be stored in the storage drive 320 or received by the controller 302 according to other aspects) and generate an output comparator signal indicative of an increase or a decrease in a current value of a PWM duty cycle based on a comparison between the current reading and the target current.

The increment or decrement control loop may be run until PWM adjustments result in a match between the controlled variable (e.g., target current from the lookup table) and the measured feedback value (e.g., current measured from the current sensor 354).

A randomizer 308 within the controller 302 may generate a randomly time-varying update signal (based on the clock 314) which may be fed to a PWM duty cycle generator 306, indicating when to update the pulse width with the new adjustment from the comparator 304. The controller 302 for SGCU randomized current feedback control may include the clock 314 driving the randomizer 308. The clock 314 may be a pseudo-random clock.

The PWM duty cycle generator 306 may receive the randomly time-varying update signal and the randomly time-varying update signal may control a cycle time associated with the PWM duty cycle generator 306. The PWM duty cycle generator 306 may receive the signal from the comparator 304 and generate an output PWM signal. The output of the PWM duty cycle generator 306 provides the sequencer 312 with a resulting pulse width, which in turn, changes an amount of current drawn from the DC source. Use of the randomized feedback correction mitigates the starter-generator or SG 358 from resonating and producing undesirable torque ripple during the speed acceleration.

The sequencer 312 may receive the output PWM signal and generate a gate control signal for controlling an inverter 356 based on the output PWM signal. The sequencer 312 may receive a positional angle associated with the SG 358 driven by the inverter 356 and generates the gate control signal for controlling the inverter 356 based on the positional angle.

According to one aspect, the randomizer 308 may vary a frequency associated with how often a battery current value is updated. For example, a control pulse may be provided which enables a change in the updating of the battery current value. A battery current feedback signal (e.g., battery_current_feedback_logic) may be implemented to control field-programmable gate array (FPGA) design for the system for engine starter control. The battery current feedback signal may be provided such that if over a midpoint, reduce the current and if under the midpoint, increase the current by an incremental amount (e.g., +/−3 incremental amount or unit for each sample period).

Examples of such variation may include waiting 3 ms until the next update, waiting 2 ms until the next update, waiting 3 ms until the next update, waiting 4 ms until the next update, etc. The randomizer 308 may control the cycle time of the control pulse to vary from cycle to cycle. This may be achieved, for example, using a pseudo-random number generator within the randomizer 308. The randomizer 308 may include a state machine which controls the sequencer 312. For example, an output signal of the pseudorandom number generator (e.g., prng_to_start_batt_curr_fb_correction) may be utilized by a firmware block sm_battery_current_feedback, which may be a state machine which acts as a controller 302 for the sequencer 312 of the battery current feedback algorithm.

In this way, mechanical and/or electrical resonance during engine starts or SG 358 speed acceleration caused by control loop adjustments may be mitigated or avoided. Starter torque ripple may be substantially reduced, thereby improving the reliability of the system for engine starter control.

Figure 4:
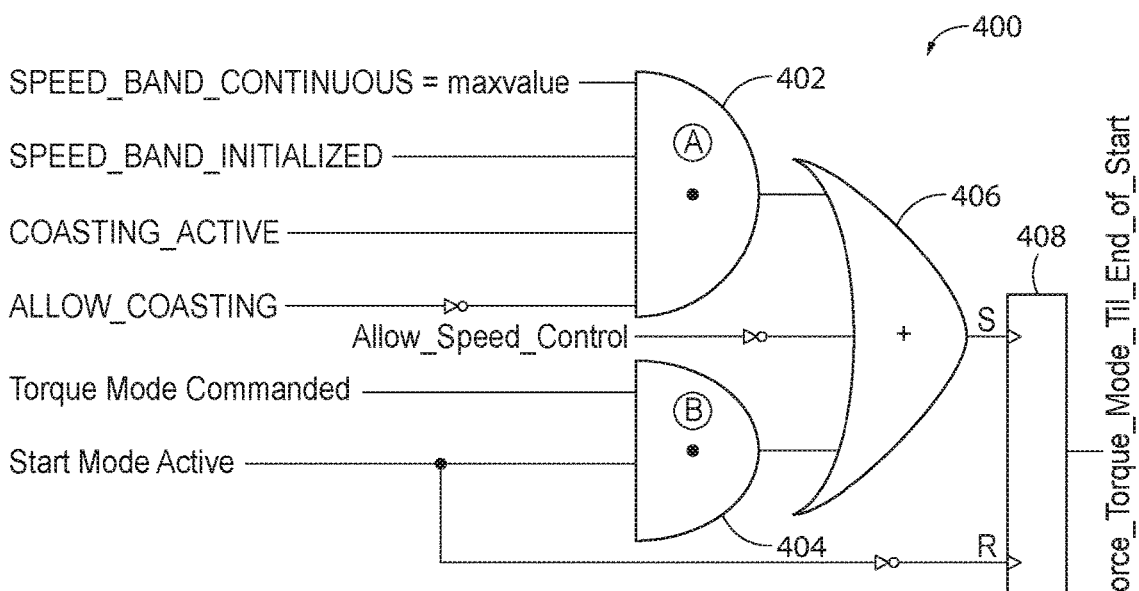
FIG. 4 is an exemplary logic diagram of a system for engine starter control, according to one aspect.

FIG. 4 is an exemplary logic diagram 400 of a system for engine starter control, according to one aspect. According to one aspect, a force_torque_mode_until_start_end signal or bit may be derived based on one or more other signals or bits. The force_torque_mode_until_start_end signal or bit may be utilized to determine whether the system for engine starter control stays in torque mode (e.g., where the lookup table is utilized) or may engage in the speed mode. The force_torque_mode_until_start_end signal or bit may be generated based on a speed_band_continuous_max_value signal, a speed_band_initialized signal, a coasting_active signal, an allow_coasting signal, an allow_speed_control signal, a torque_mode_commanded signal, and a start_mode_active signal. As seen in FIG. 4, the speed_band_continuous_max_value signal, the speed_band_initialized signal, the coasting_active signal, and an inverse of the allow_coasting_signal are ANDed. The output of this first AND gate 402 may be ORed with an inverse of the allow_speed_control signal and an AND 404 product of the torque_mode_commanded signal and the start_mode_active signal. This OR gate 406 product and an inverse of the start_mode_active signal may be utilized to drive a cell 408, such as a memory cell or flip-flop. For example, the OR gate 406 product may be used to drive the set of the memory cell while an inverse of the start_mode_active signal may be used to drive the reset of the memory cell, which derives the force_torque_mode_until_start_end signal.

According to one aspect, the speed above the upper band at the beginning of the start and coasting may not be permitted to go into torque mode if this happens. The speed_select signal may be set as active while a start is in progress. The speed_band_initialized signal may be indicative of whether or not the speed band value is to be utilized, with reference to speed bands A-I of FIG. 1. The coasting_active signal may be set by a state within a start state machine. The allow_coasting signal and the allow_speed_control may be indicative of a new configuration register bit. The speed_select signal may be associated with a torque mode commanded after debouncing. The start_mode_active signal may be set equal to one during an initial step of the start state machine and set equal to zero as a final step of the start state machine.

The force_torque_mode_until_start_end signal, when active, may enable operation in torque control mode until the end of the start and may disable speed control until the next start occurs. In this way, the logic of FIG. 4 may be utilized to determine the operating mode for the system for engine starter control so that the starter operates in torque control until the end of the start in a manner where no transition to speed control occurs.

Figure 5:
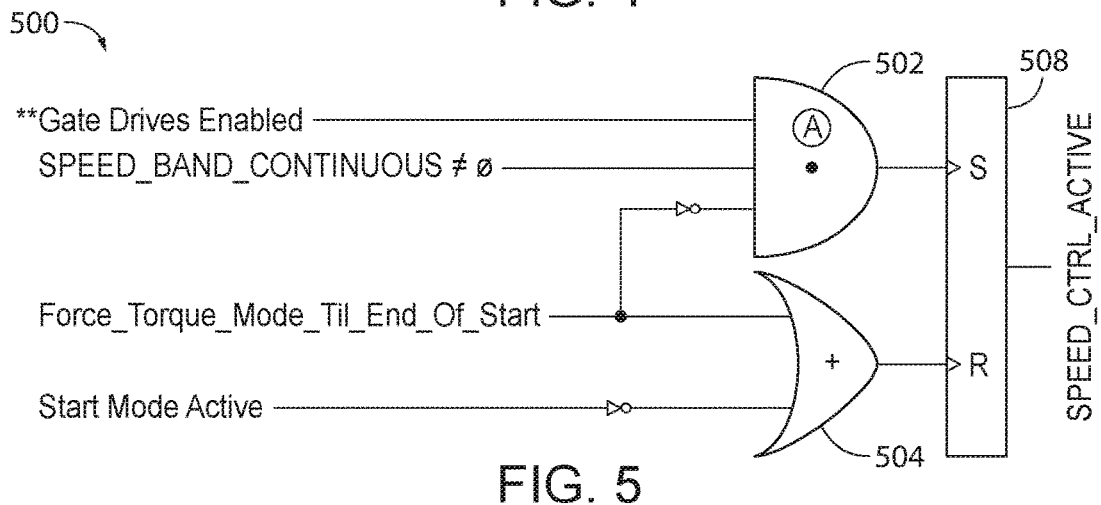
FIG. 5 is an exemplary logic diagram of a system for engine starter control, according to one aspect.

FIG. 5 is an exemplary logic diagram 500 of a system for engine starter control, according to one aspect. According to one aspect, a speed_control_active signal may be generated based on one or more other signals. The speed_control_active signal may be utilized to set a corresponding speed_control_active bit. When the speed_control_active bit is active, the speed control algorithm runs (i.e., in lieu of using strict lookup tables). According to one aspect, the force_torque_mode_until_start_end signal or bit may be utilized to set the speed_control_active signal or bit.

The speed_control_active signal or bit may be set based on a gate_drives_enabled signal, a speed_band_continuous signal, the force_torque_mode_until_start_end signal, and the start_mode_active signal. For example, the gate_drives_enabled signal, the speed_band_continuous signal, and an inverse of the force_torque_mode_until_start_end signal may be ANDed by an AND gate 502 and the force_torque_mode_until_start_end signal and an inverse of the start_mode_active signal may be ORed by an OR gate 504. The AND gate output may be used to drive a set of a memory cell 508 and the OR gate output may be used to drive the reset of the memory cell. The memory cell may be used to derive the speed_control_active signal.

According to one aspect, the AND gate output may be indicative of whether the speed is within the speeds bands, such as the speed bands of FIG. 1. The gate_drives_enabled signal may be set by the start state machine, the speed_band_continuous signal may be indicative of whether the speed band is initialized for gate drives to be enabled. The reset of the memory cell may have priority and either the speed is below the upper speed band or latched in torque mode to achieve an active speed_control_active signal. In this way, the logic of FIG. 5 may enable activation of speed control via the active speed_control_active signal when the speed is between the specified speed bands and no latching of torque mode is determined. Once activated, the speed control may remain active until a transition to torque mode is desired.

Figure 6:
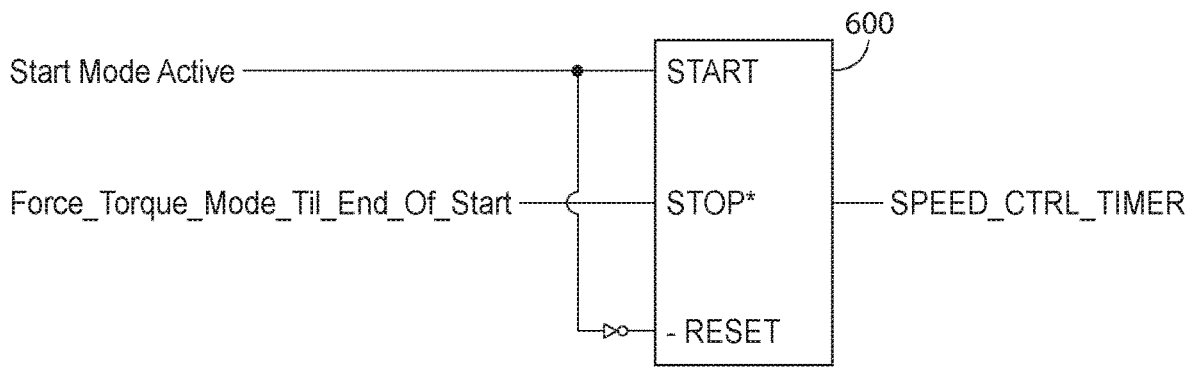
FIG. 6 is an exemplary logic diagram of a system for engine starter control, according to one aspect.

FIG. 6 is an exemplary logic diagram 600 of a system for engine starter control, according to one aspect. The logic of FIG. 6 may be a timer driven by the start_mode_active signal. For example, the start_mode_active signal may drive the start of the timer and an inverse of the start_mode_active signal may be used to drive the reset of the timer. The force_torque_mode_until_start_end signal may be used to drive a stop of the timer. The timer may generate a speed_control_timer signal, which may be indicative of an amount of time start mode operation has been in effect (without any transition to torque control).

According to one aspect, if the timer times out, an exit condition may be met for the start procedure and the start may be aborted by setting a speed_control_timer_timeout equal to one. The stop of the timer may be prioritized over the start of the timer. The timeout value may be a predetermined timer value for the speed_control_timer_timeout, which may be latched to the start exit condition. In this way, the logic or the timer of FIG. 6 may enable timing upon entry into the start mode associated with pure use of the speed mode or until a permanent transition to torque mode is made. The timer may be reset when start mode terminates based on the stop of the timer. If the timer expires, an exit condition for the start may be initiated within the start sequence state machine.

Figure 7:
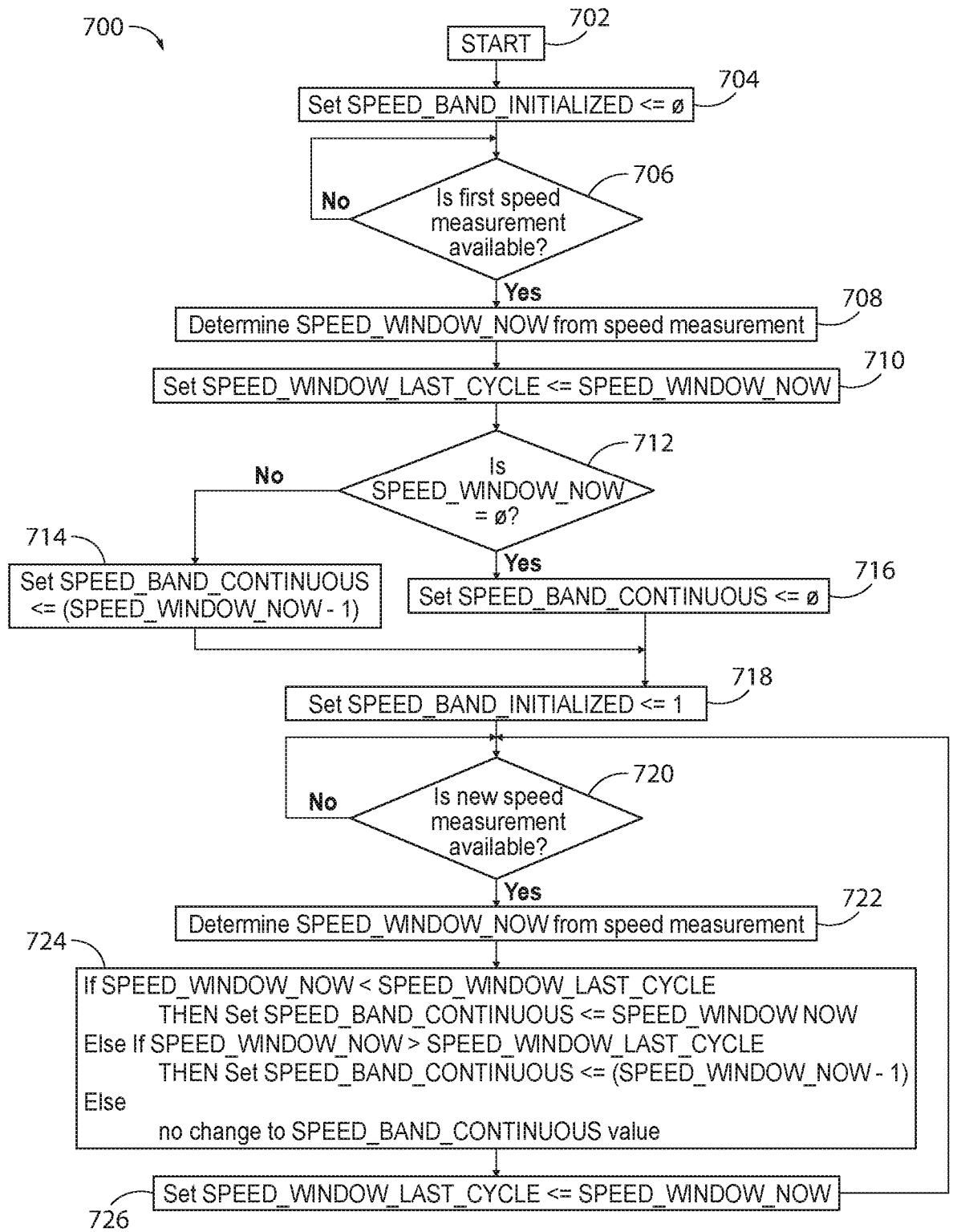
FIG. 7 is an exemplary flow diagram of a method for engine starter control, according to one aspect.

FIG. 7 is an exemplary flow diagram of a method 700 for engine starter control, according to one aspect. The method 700 of FIG. 7 may be utilized to determine a speed band associated with the start procedure. According to one aspect, an input to this flow diagram may be a speed measurement. The outputs may be a speed_band_initialized bit or signal and a speed_band_continuous word or signal. The speed_band_initialized bit may be indicative of when to use the value from the speed_band_continuous word or signal. To determine the speed band, the method 700 of FIG. 7 utilizes a speed window variable. The speed window value may be indicative of whether a present or current speed is between two speed values. So if the speed is hovering right at a border or boundary between two speed windows, the speed window value may change back and forth between two values. The speed band value may be implemented to include hysteresis to mitigate these repeated value changes back and forth.

The method 700 for engine starter control may include beginning 702 by setting 704 a speed_band_initialized bit to <=zero, determining 706 whether a first speed measurement is available, when the first speed measurement is available, determining 708 a current speed_window_now from the speed measurement, setting 710 a speed_window_last_cycle<=speed_window_now, determining 712 whether speed_window_now=0, if speed_window_now=0 at 716, setting speed_band_continuous<=0, if speed_window_now is not equal to 0 at 714, setting speed_band_continuous<=(speed_window_now−1). In this way, the initialization of values may occur because the speed band value is unknown.

The method 700 for engine starter control may include setting 718 the speed_band_initialized<=1, determining 720 whether another speed measurement is available, and if yes, determining 722 speed_window_now from the updated speed measurement. At 724, if the speed_window_now<speed_window_last_cycle, then set speed_band_continuous<=speed_window_now. If speed_window_now>speed_window_last_cycle, then set speed_band_continuous<=(speed_window_now−1). In this way, the method 700 for engine starter control may determine the current speed window and check to see if any change in speed window has occurred.

The method 700 for engine starter control may include 726 setting speed_window_last_cycle<=speed_window_now to remember the current speed window, thereby enabling the method 700 to tell whether a change in speed windows occurs at the next speed measurement.

Figure 8A:
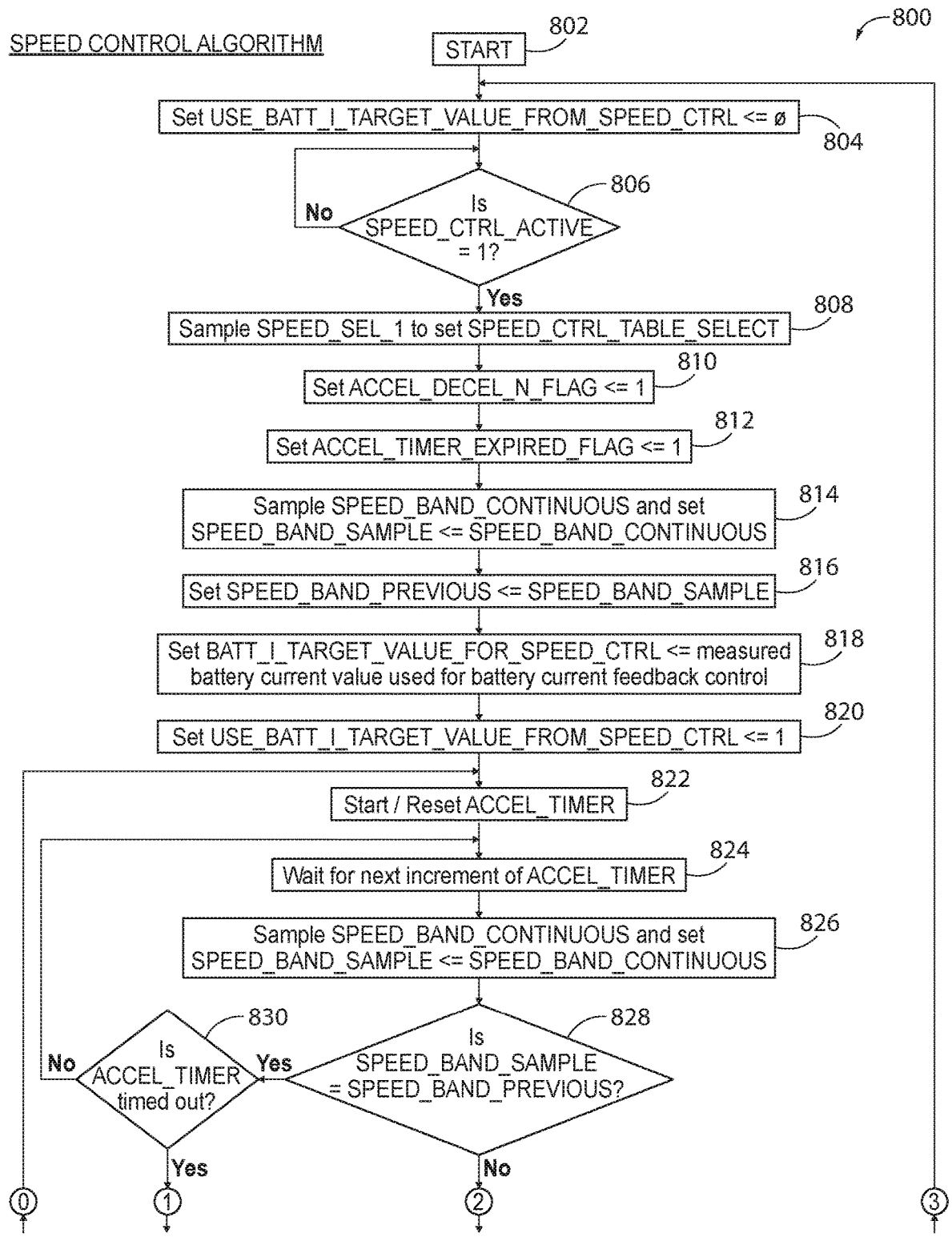
FIG. 8 is an exemplary flow diagram of a method for engine starter control, according to one aspect.
Figure 8B:
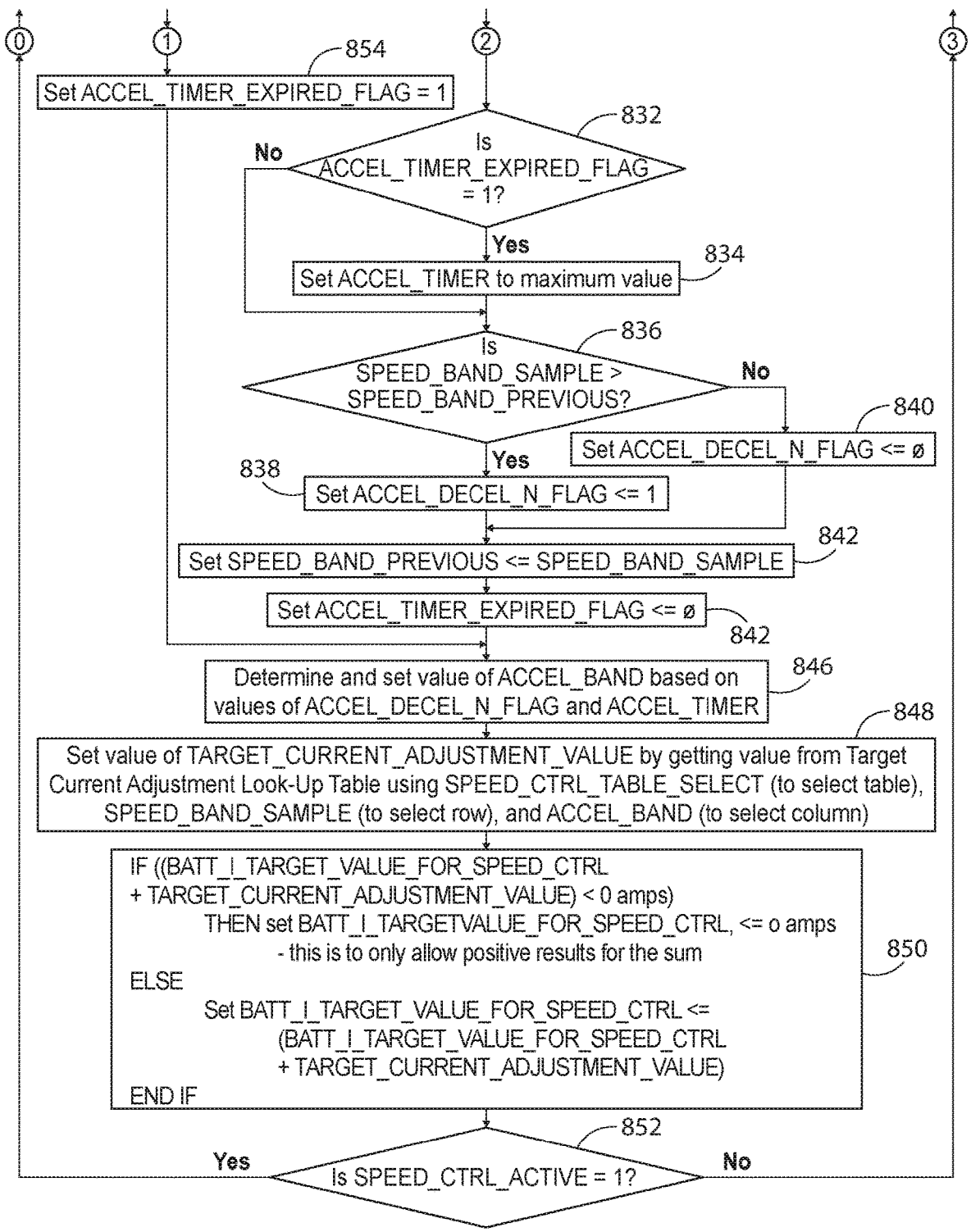

FIG. 8 is an exemplary flow diagram of a method 800 for engine starter control, according to one aspect. This method 800 may utilize the speed_control_active signal to determine when the method 800 should implement speed mode. The speed control method 800 may use the speed_band_continuous value output from the speed band determination method 700 of FIG. 7 to generate a target current value. The method 800 also generates a bit (e.g., use_batt_i_target_value_from_speed_control) that may be indicative of when use the target current value generated. To generate the target current value, the method 800 times how long it takes to change speed bands in order to estimate the acceleration rate. Then the method 800 may determine whether the speed is increasing (e.g., accelerating) or decreasing (e.g., decelerating). This information may be used to select an adjustment value for the target current value from a look-up table.

The method 800 for engine starter control may include beginning 802 by setting 804 use_batt_I_target_value_from_speed_control<=0, determining 806 whether the speed_control_active=1, and if speed_control_active=1, sampling 808 the speed_select_1 signal to set the speed_control_variable_select signal, initialization of acceleration_deceleration flag 810, acceleration_timer_expired_flag 812, and at 814, speed_band_sample<=speed_band_continuous, at 816, speed_band_previous<=speed_band_sample, at 818, batt_I_target_value_for_speed_control<=measured battery current value used for battery current feedback control, at 820, use_batt_I_target_value_from_speed_control<=1.

The method 800 for engine starter control may include starting or resetting 822 the acceleration_timer, waiting 824 for an increment of the acceleration_timer, sampling 826 speed_band_continuous and setting speed_band_sample<=speed_band_continuous, determining 828 whether speed_band_sample=speed_band_previous and determining 830 whether the acceleration_timer has timed out.

If speed_band_sample is not equal to speed_band_previous, a check 832 is made to see whether the acceleration_timer_expired_flag is set to 1. If the acceleration_timer_expired_flag is set to 1, the acceleration_timer is set 834 to a maximum value. If the speed_band_sample>speed_band_previous 836, the acceleration_deceleration flag is set to 1 at 838, otherwise, the acceleration_deceleration flag is set to 0 at 840, the speed- _band_previous is set 842 to <=speed_band_sample, and acceleration_timer_expired_flag is set 844 to 0.

If speed_band_sample=speed_band_previous and the acceleration_timer has timed out, the acceleration_timer_expired_flag is set to 1.

The acceleration_band is set 846 based on values of the acceleration_deceleration flag and the acceleration_timer. The value of the target_current_adjustment_value may be set 848 based on the target current adjustment lookup table using speed_control_table_select, speed_band_sample, and acceleration_band.

The method 800 may include determining 850 if ((batt_i_target_value_for_speed_ctrl+target_current_adjustment_value)<0 amps) then set batt_i_target_value_for_speed_ctrl, <=0 amps else set batt_i_target_value_for_speed_ctrl<=(batt_i_target_value_for_speed_ctrl+target_current_adjustment_value).

The method 800 may include determining 852 whether speed_control_active is =1. If yes, then resetting the acceleration_timer and waiting for another target current adjustment. If not, the watching to execute speed control.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims. Additionally, any of the logics described herein may be implemented as a hardware circuit or as firmware.

The invention claimed is:

1. A system for jet engine starter control, comprising a controller configured to:
   determine a current speed band associated with an engine start for a current time increment;
   determine a previous speed band associated with the engine start for a previous time increment within the engine start;
   receive a measured current value;
   determine a target current value based on the current speed band, the previous speed band, and whether an acceleration or deceleration occurred between the current speed band and the previous speed band; and
   adjust a current for the engine start based on the target current value.

2. The system for jet engine starter control of claim 1, wherein the controller determines the target current value based on a mode of the system for engine starter control.

3. The system for jet engine starter control of claim 2, wherein the mode of the system for engine starter control is a speed mode or torque mode.

4. The system for jet engine starter control of claim 1, wherein the controller determines the target current value based on two or more different lookup tables.

5. The system for jet engine starter control of claim 4, wherein the controller selects a first lookup table of the two or more different lookup tables based on a mode of the system for engine starter control.

6. The system for jet engine starter control of claim 5, wherein the controller selects a row of the first lookup table based on the current speed band associated with the engine start.

7. The system for jet engine starter control of claim 5, wherein the controller selects a column of the first lookup table based on the acceleration or deceleration determination.

8. The system for jet engine starter control of claim 1, wherein the controller operates in a coast state as an initial state for the engine start.

9. The system for jet engine starter control of claim 1, wherein the controller determines the target current value based on an outer low speed threshold.

10. The system for jet engine starter control of claim 1, wherein the controller determines the target current value based on a threshold target and a lower than nominal threshold.

11. A system for jet engine starter control, comprising a controller configured to:
    determine a current speed band associated with an engine start for a current time increment;
    determine a previous speed band associated with the engine start for a previous time increment within the engine start;
    receive a measured current value;
    determine a target current value based on the current speed band, the previous speed band, whether an acceleration or deceleration occurred between the current speed band and the previous speed band, and a mode of the system for engine starter control; and
    adjust a current for the engine start based on the target current value.

12. The system for jet engine starter control of claim 11, wherein the mode of the system for engine starter control is a speed mode or torque mode.

13. The system for jet engine starter control of claim 11, wherein the controller determines the target current value based on two or more different lookup tables.

14. The system for jet engine starter control of claim 11, wherein the controller determines the target current value based on an outer low speed threshold.

15. A method for jet engine starter control, comprising:
    determining a current speed band associated with an engine start for a current time increment;
    determining a previous speed band associated with the engine start for a previous time increment within the engine start;
    receiving a measured current value;
    determining a target current value based on the current speed band, the previous speed band, whether an acceleration or deceleration occurred between the current speed band and the previous speed band, and a mode of a system for engine starter control; and
    adjusting a current for the engine start based on the target current value.

16. The method jet engine starter control of claim 15, wherein the mode of the system for engine starter control is a speed mode or torque mode.

17. The method for jet engine starter control of claim 15, comprising determining the target current value based on two or more different lookup tables.

18. The method for jet engine starter control of claim 17, comprising selecting a first lookup table of the two or more different lookup tables based on the mode of the system for engine starter control.

19. The method for jet engine starter control of claim 18, comprising selecting a row of the first lookup table based on the current speed band associated with the engine start.

20. The method for jet engine starter control of claim 18, comprising selecting a column of the first lookup table based on the acceleration or deceleration determination.

* * * * *